United States Patent [19]

Fujita

[11] 3,984,825

[45] Oct. 5, 1976

[54] CONDITION MONITORING APPARATUS

[75] Inventor: Teizo Fujita, Osaka, Japan

[73] Assignee: Izumi Denki Company Limited, Osaka, Japan

[22] Filed: Oct. 1, 1974

[21] Appl. No.: 510,877

[30] Foreign Application Priority Data

June 21, 1974 Japan ................................ 49-71605

[52] U.S. Cl. .......................... 340/213.1; 331/113 R; 340/326; 340/327

[51] Int. Cl.² ...................... G08B 25/00; H04Q 9/00

[58] Field of Search .......... 340/213 R, 213.1, 213.2, 340/226, 408, 181, 227 R, 240, 241, 276, 326, 327, 81 R, 81 F, 83, 331, 332; 331/113 R, 64

[56] References Cited

UNITED STATES PATENTS

| | | | |
|---|---|---|---|
| 3,136,982 | 6/1964 | Sargent | 340/213.1 |
| 3,525,988 | 8/1970 | Linder | 340/213.1 |
| 3,529,305 | 9/1970 | Hardin | 340/213.1 |
| 3,623,048 | 11/1971 | Haddock | 340/213.1 |
| 3,680,068 | 7/1972 | Hanchett | 340/213 |
| 3,810,149 | 5/1974 | Miller et al. | 340/326 |
| 3,829,830 | 8/1974 | Scarpino | 340/83 |

*Primary Examiner*—John W. Caldwell
*Assistant Examiner*—James J. Groody
*Attorney, Agent, or Firm*—Pollock, Vande Sande & Priddy

[57] ABSTRACT

Alarm apparatus for providing a distinctive indication of an alarm condition and comprising a visual alarm device such as a signal lamp and also an aural indication device comprising either a bell or buzzer. In response to an alarm input, an astable multivibrator is operated to a condition where it alternately provides respectively opposite outputs at its two output terminals. In response thereto, the lamp is intermittently energized to provide a flashing signal output, and the buzzer or bell is energized to provide a distinctive alarm signal. An acknowledge push button is also provided which, when actuated in response to an alarm indication, operates the astable multivibrator to a further condition in which both outputs of the multivibrator assume the same output condition, and in response to this the lamp becomes steadily energized and the bell or buzzer becomes deenergized.

6 Claims, 6 Drawing Figures

CONDITION MONITORING APPARATUS

BACKGROUND OF THE INVENTION

1. Field of the Invention

The present invention relates to alarm apparatus and more particularly to alarm apparatus for indicating generation of an alarm or abnormal signal.

2. Description of the Prior Art

There is a problem in reliability of conventional alarm apparatus which will later be described in detail with reference to the accompanying drawings. In such conventional alarm apparatus, a flicker signal generator circuit or a drive circuit for energizing an acoustic signaling device, such as a bell or a buzzer, etc., is provided as a common unit for the respective alarm units one of which is installed at each alarm point. Accordingly, if a trouble occurs in any one of these common units, the overall alarm apparatus is out of order. Under such circumstances, the reliability of the alarm apparatus, which is especially important in this kind of apparatus, is impaired. Another problem found in conventional alarm apparatus stems from the fact that the alarm apparatus is used together with an alarm signal display unit but with the alarm unit and the display unit being disposed separately. As a result, wiring between both the units is complicated. Further, when a plurality of alarm units is connected to one display unit, it is difficult to identify the particular alarm circuit which is generating an alarm signal indicated by the display unit.

SUMMARY OF THE INVENTION

Accordingly, a first object of the present invention is to provide a reliable alarm apparatus in which each alarm unit has a flicker function and is provided with a switching means, thereby to identify and ascertain an abnormal state at each alarm point.

A second object of the present invention is to provide an alarm apparatus which is small in size and compact in style, and further is easy in fabricate.

According to one aspect of the present invention, there is provided an alarm apparatus comprising: an astable multivibrator circuit having two output terminals and, when activated in a normal condition, assuming a first state in which first and second potentials are alternately produced at each of the two output terminals in opposite relation with each other; first means having an input terminal for receiving an alarm signal to activate the astable multivibrator circuit in response to the alarm signal arriving at the input terminal; second means for indicating the presence of the alarm signal; third means connected to predetermined one of the two output terminals of the astable multivibrator circuit for activating the second means during the presence of the first potential at the predetermined one output terminal; a connection terminal for connecting an acoustic signaling means which produces an acoustic signal in response to the second potential; fourth means to lead the second potential appearing at the two output terminals to the connection terminal; fifth means connected to the connection terminal for making ineffective the second potential appearing at the connection terminal when the fifth means is activated; and sixth means for switching the astable multivibrator circuit in response to the activation of the fifth means from the first state to a second state in which the two output terminals are simultaniously held at the first potential.

The above and other objects, features and advantages will be apparent from the detailed description taken in conjunction with the accompanying drawings.

DESCRIPTION OF THE PREFERRED EMBODIMENTS

Figure 1:
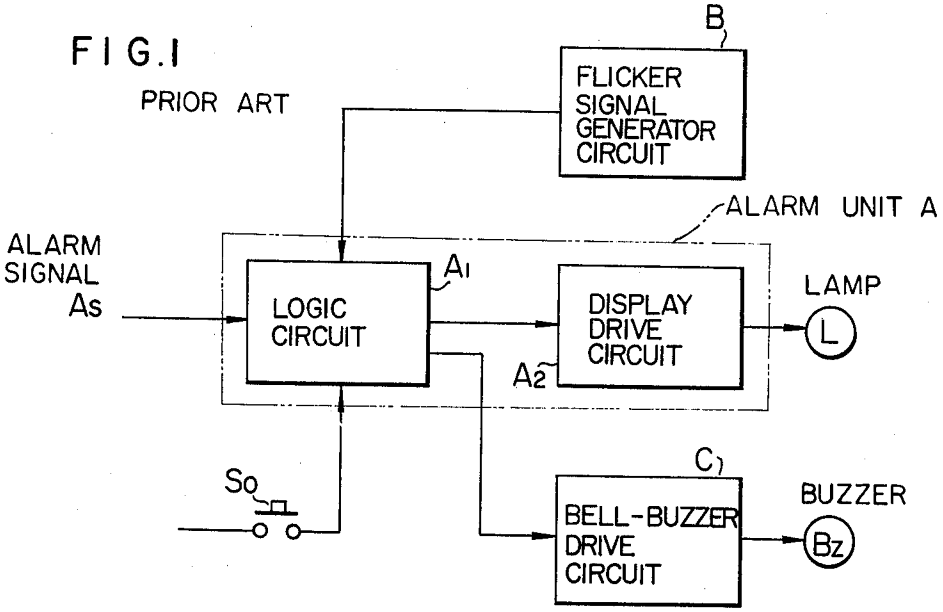
FIG. 1 PRIOR ART
FIG. 1 is a simplified schematic diagram of a conventional alarm apparatus to aid in explaining the operation thereof.
Figure 2:
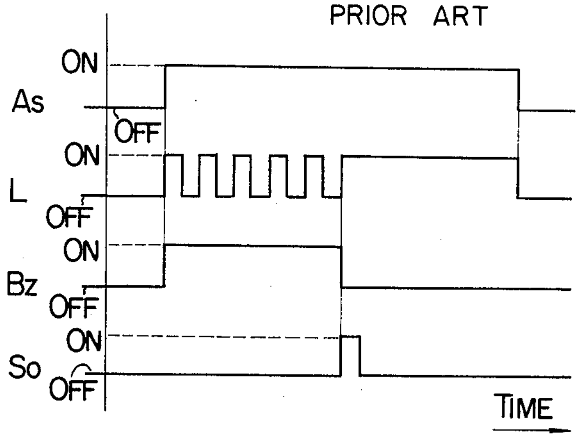
FIG. 2 PRIOR ART
FIG. 2 is a timing diagram useful in explaining the operation of the conventional alarm apparatus.

FIG. 1 is a schematic block diagram of a conventional alarm apparatus for explaining the operation thereof, and FIG. 2 is a timing diagram illustrating the operation of the alarm apparatus in FIG. 1. Generally, an alarm apparatus is usually used in a form of system assembled from several to several tens of units. More particularly, an alarm unit A is provided at each alarm point. A flicker signal generating circuit B, a drive circuit C for energizing an acoustic signaling device Bz such as a bell or a buzzer, and a push-button switch So for ascertaining generation of an alarm are provided as common units for the whole alarm apparatus. In operation, it is assumed that an alarm signal $A_s$ is first applied to a logical unit $A_1$ of an alarm unit A. A flicker signal from the flicker signal generating circuit B is applied to a display lamp L through a display drive circuit $A_2$ to thereby cause the display lamp to flicker. At the same time, the acoustic signaling device drive circuit C is activated to buzz the buzzer Bz. Then, if the push-button switch So is pushed down, the display lamp L is changed from a flickering condition to a continuously illumenated condition. The change in the condition of the lamp L indicates that the generation of the alarm signal has been recognized. At this time, buzzing of the buzzer is stopped. Subsequently, the display lamp L is maintained in the continuously illuminated condition during application of the alarm signal As, and is turned out immediately after the alarm signal is removed. FIG. 2 illustrates diagramatically the operation just described of the alarm apparatus with respect to time.

In such prior art alarm apparatus, when trouble occurs in any one of the common units, the entire alarm apparatus is effectively disabled. Thus, such conventional alarm apparatus has a problem in reliability which is serious in alarm apparatus. Further, when the place to identify an abnormal point is distant from the place at which the push-button is fitted, the loss of time is large. The problem arising in the conventional alarm apparatus, caused from the fact that the display unit and the alarm unit are separately provided, is as previously described.

To eliminate the defects mentioned above, the present invention is proposed. The features of the present invention will briefly be summarized as follows: In the circuit construction of an alarm apparatus, each alarm unit is provided with a flicker function and switching means to thereby enable each alarm unit to identify and ascertain an alarm or abnormal signal independently of one another. In fabrication, each alarm unit and display unit are easily assembled and the overall alarm apparatus may be made into a small and compact unit.

Figure 3:
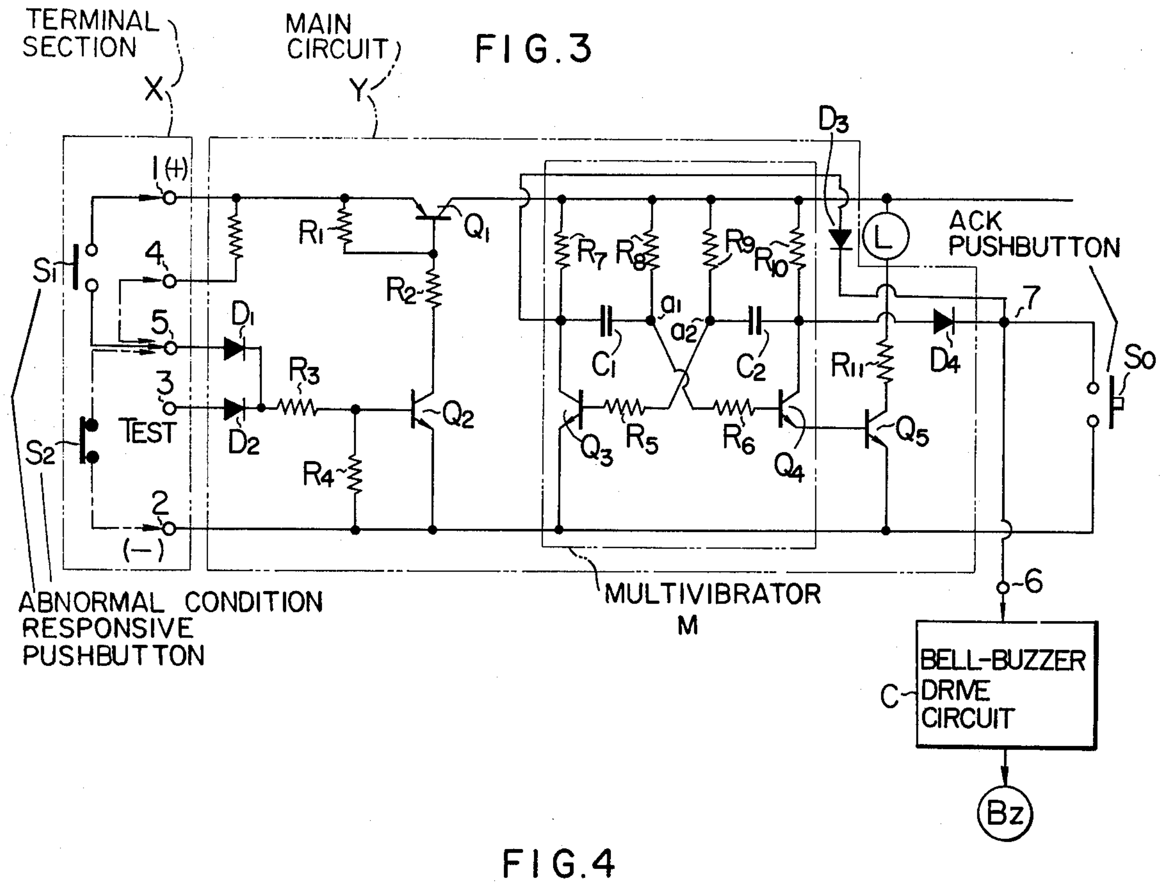
FIG. 3 is a schematic circuit diagram of the principle circuit of the alarm apparatus according to the present invention.

Referring now to FIG. 3, there is shown a circuit diagram of an embodiment of the alarm apparatus according to the present invention. In the drawing, a block X surrounded with a two-dot chain line is a terminal section comprising d.c. power source terminals 1 and 2, a test terminal 3, bridge terminals 4 and 5. When it is desired to operate the circuit of the following stage through the actuation of a normally open contact $S_1$, the contact $S_1$ is connected between the terminals 1 and 5 as shown with a full line. On the other hand, when it is desired to operate the circuit of the following stage by using the normally close contact $S_2$, the terminals 4 and 5 are bridged as shown with a one-dot chain line and the contact $S_2$ is connected between the terminals 2 and 5. Such contact $S_1$ or $S_2$ is actuated when an alarm or abnormal signal is generated, i.e. in response to the occurence of abnormal temperature, abnormal pressure, or the like.

A main circuit Y constituting the chief portion of the alarm apparatus is comprised of two stages: One is a so-called switching circuit including transistors $Q_1$ and $Q_2$, and resistors $R_1$ and $R_2$; the other is a unique astable multivibrator circuit M comprising transistors $Q_3$ and $Q_4$. The respective collectors of the transistors $Q_3$ and $Q_4$ are connected to the collector circuit of the transistor $Q_1$ through resistors $R_7$ and $R_{10}$ and also connected to the anodes of diodes $D_3$ and $D_4$ whose cathodes are commonly connected to a node 7. The bases of the transistors $Q_3$ and $Q_4$ are connected to the collector circuit of the transistor $Q_1$ through a series circuit of resistors $R_5$ and $R_9$ and a series circuit of resistors $R_6$ and $R_8$ respectively. Further, a capacitor $C_1$ is connected between the collector of the transistor $Q_3$ and the junction point $a_1$ between the resistors $R_6$ and $R_8$, and a capacitor $C_2$ is also connected between the collector of the transistor $Q_4$ and the junction point $a_1$ between the resistors $R_5$ and $R_9$. The resistance of each of the resistors $R_5$ and $R_6$ is larger than the resistance between the collector and emitter of each transistor $Q_3$ and $Q_4$ when these transistors are conductive. The capacitors $C_1$ and $C_2$, and the resistors $R_7$ to $R_{10}$ are conventional ones which are used in the conventional astable multivibrator. The transistor $Q_4$ is connected in a Darlington connection with the transistor $Q_5$, the collector-emitter circuit of which also forms a series circuit together with a resistor $R_{11}$ and an alarm signal display means, for example, a lamp L. A switching means $S_0$, for example a push-button, is connected at one end thereof with the node 7 while connected at the other end thereof with ground potential. A known acoustic signaling device drive circuit C for actuating an acoustic signaling device, for example a bell or a buzzer, is connected to the node 7 through a terminal 6. The terminal 6 belongs to the terminal section X aforementioned.

Description will next be given as to the circuit operation of the alarm apparatus according to the invention when the normally open contact $S_1$, which is to be closed when an abnormal stage occurs, is connected between the terminals 1 and 5. In a normal state, the contact $S_1$ is open so that the transistor $Q_2$ is not conductive and thus the transistor $Q_1$ is also not conductive. Accordingly, the astable multivibrator circuit M of the subsequent stage is not in operation, and the display lamp L and the drive circuit C are also not activated. When an abnormal signal is generated and the contact $S_1$ is closed in response to it, the transistor $Q_2$ and thus the transistor $Q_1$ are turned on, thereby allowing the power source voltage to be applied to the astable multivibrator circuit M. Upon thte application of the power source voltage, the astable multivibrator M operates in such a manner that each of the transistors $Q_3$ and $Q_4$ is alternately caused to be turned on and off in opposite relation with each other, so that the conduction of the transistor $Q_4$ makes the display lamp L turn on while the conduction of the transistor $Q_3$ makes the display lamp L turn off. Thus, the display lamp L lights in a flickering mode. It is to be noted that with the Darlington connection between the transistors $Q_4$ and $Q_5$, the input impedance of the display lamp L is high and so the lamp circuit has little effect on the period in the flickering operation, i.e. the turn-on time and the turn-off time of the display lamp. That is, imbalance between the turn-on time and the turn-off time may be eliminated.

Figure 4:
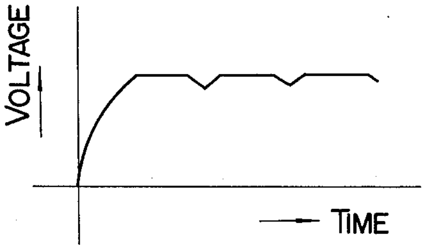
FIG. 4 is a wave form of the voltage appearing at the node 7 in FIG. 3.

In operation of the astable multivibrator circuit M, the output with a wave form as shown in FIG. 4 appears at the node 7 which is connected with the collectors of the transistors $Q_3$ and $Q_4$ through the diodes $D_3$ and $D_4$, and the output causes the bell or buzzer to ring or buzz through the driving circuit C. If the pushbutton $S_0$is pushed, the node 7 of the diodes $D_3$ and $D_4$ is grounded and thus feeding of the input to the drive circuit is stopped. As a result, the bell or the buzzer is stopped to ring or buzz. When the pushbutton is held pushed down, the capacitors $C_1$ and $C_2$ constituting the astable multivibrator circuit M are charged to make the respective junction points $a_1$ and the $a_2$ sides of these capacitors positive in polarity. Accordingly, the transistors $Q_3$ and $Q_4$ are forwardly biased with the application of positive polarity to the bases thereof, thereby both becoming conductive. The conduction of both the transistors $Q_3$ and $Q_4$ also causes the lamp L to change from the flickering mode to a continuously illuminated mode. After this, even if the push-button switch $S_0$ is opened and thus the node 7 is separated from ground potential, the capacitors $C_1$ and $C_2$ are maintained positive in potential at the $a_1$ and $a_2$ sides thereof respectively, and therefore the transistors $Q_3$ and $Q_4$ are also maintained conductive to hold the display lamp L in the continuously illuminated condition, thereby indicating recognition of the alarm signal. This is because the virtual resistance between the collector and the emitter of each transistor $Q_3$ and $Q_4$ is low at this time, and, additionally, the respective resistances of the resistors $R_5$ and $R_6$ which are connected to the bases of the transistors $Q_3$ and $Q_4$ are selected to be larger than those virtual resistances. When the normally open contact $S_1$ is opened, that is, when the contact $S_1$ returns to a normal state, the display lamp L is turned off. In other words, in this case, the transistors $Q_1$ and $Q_2$ are turned off so that the astable multivibrator is deenergized and thus the overall alarm apparatus returns to the initial state thereof.

The following description relates to the operation of the alarm apparatus when a normally closed contact $S_2$, i.e. a contact which is opened in an abnormal state, is employed and connected between the terminals 2 and 5 as shown with the dot dash line, instead of the contact $S_1$. In this case, the terminals 4 and 5 are short-circuited, as shown with a two-dot chain line in FIG. 3. Normally, the contact $S_2$ is closed so that the terminal 5 is at low potential, and the transistor $Q_2$ and thus the transistor $Q_1$ are not conductive. When an alarm or abnormal signal is generated and the contact $S_2$ is opened, the potential at the terminal 5 is high so that the transistor $Q_2$ and thus transistor $Q_1$ also are turned on, and hence the following circuit will be activated successively. The operation of the remainder of the circuit is the same as that in the case of using the normally open contact $S_1$ previously described.

Figure 5:
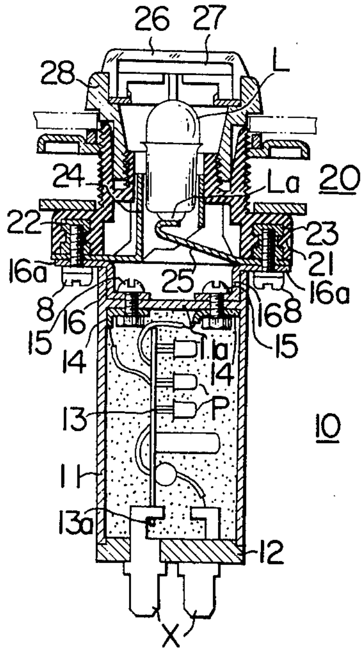
FIG. 5 is a vertical sectional view of an embodiment of the alarm apparatus according to the present invention.

The following description relates to the structure of the alarm apparatus. FIG. 5 shows a first embodiment illustrating a particular structure of the alarm apparatus, in which an alarm unit 10 preliminarily accommodates the main circuit Y in the case 11. A bottom cover 12 of the case 11 is provided with the terminal section X whose terminals 1 to 6 protrude into the inside and outside of the case 11. A printed circuit board 13 is provided with circuit elements P attached thereto such as the transistors $Q_1$ to $Q_4$, the capacitors $C_1$ and $C_2$, the resistors $R_1$ to $R_{11}$, and diodes $D_1$ to $D_4$, etc. A contact portion 13*a* at the lower end of the print circuit board is mechanically and electrically connected to the inner end portion of the case 11 by means of soldering, for example. Terminal plates 14 and 14 and connector plates 16 and 16 are attached to the lower and upper surfaces of the upper wall 11*a* of the case 11, respectively, by means of screws 15 and 15, and are electrically connected to the printed circuit board 13. The connector plates 16 and 16 have extending portions 16*a* and 16*a*, respectively, each of which extends outside from the case 11. A display lamp unit 20 is mounted on the upper portion of the alarm unit 10 so that the display lamp L mounted therein can flicker in response to an alarm or abnormal signal detected by the alarm unit 10. That is, fitting nuts 22 and 23 are embedded in a frame portion 21 of insulating material and the openings of the nuts 22 and 23 meet the lower surface of the frame portion 21. A socket 24 for the display lamp L is fixed to one of the fitting nuts 22 with an electrical conduction therebetween. A contact member 25 is fixed at its one end to the other of the fitting nuts 23 and the free end of the contact member 25 is in contact with a contactor La of the display lamp L. The display lamp unit 20 is further provided with an illumination lens 26, a display panel 27 of acrylic resin or the like, and a fitting cap 28. Then, the alarm unit 10 and the display lamp unit 20 are fixedly combined in a manner such that the extending portions 16*a* and 16*a* of the connector plates 16 and 16 mounted on the case 11 are aligned with the fitting nuts 22 and 23 of the display lamp unit 20, facing to each other, and these are fixed by means of the connecting screws 8 and 8. Thus, the connector plates 16 and 16 are electrically connected with the circuit elements P of the print circuit board 13 through the terminal plates 14 and 14, and the fitting nuts 22 and 23 are connected to the display lamp socket 24 and the contactor 25, respectively. For this, just combining of the alarm unit 10 with the display lamp unit 20 completes the wiring connection therebetween.

Figure 6:
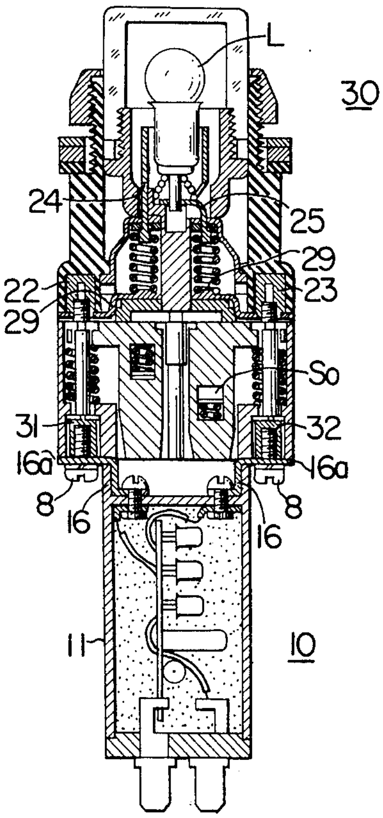
FIG. 6 is a vertical sectional view of another embodiment of the alarm apparatus according to the present invention.

FIG. 6 shows a second embodiment illustrating a particular structure of the alarm apparatus according to the present invention. In this embodiment, the display lamp unit 20 used in the previous embodiment is replaced by an illumination type push-button switch 30 composed of a display lamp and a push-button switch. Thus, the display lamp unit L and the push-button switch $S_0$ are assembled into the alarm apparatus as a unity in this embodiment. The illumination type push-button switch 30 is the same as the well known illumination type push-button switch, except that the extending portions 16*a* and 16*a* of the connector plates 16 and 16 mounted on the case 11 of the alarm unit 10 are aligned with the fitting nuts 31 and 32 of the illumination type push-button switch 30, facing to each other, and these are fixedly connected by means of connecting screws 8 and 8. The fitting nuts 31 and 32 penetrate through the push-button switch $S_0$ and are attached at the end thereof to the fitting nuts 22 and 23. Then, the fitting nuts 31 and 32 are connected through the contactors 29 and 29 with the display lamp socket 24 and the contactor 25, thereby securing an electrical connection with the display lamp.

From the foregoing description, it can be seen that, according to the present invention, the alarm apparatus may be realized in a very simple way, which is capable of providing an alarm signal and the ascertainment thereof as described with respect to the timing chart in FIG. 2, with a unique astable multivibrator which is constructed by using some additional elements such as diodes $D_3$ and $D_4$ and the resistors $R_5$ and $R_6$ to the conventional astable multivibrator, together with the push-button switch $S_0$, the display lamp L, and the acoustic signaling device drive circuit C. Further, in the alarm apparatus according to the present invention, the alarm or abnormal point may easily be identified and ascertained with the result that even if a plurality of alarm apparatuses are used in a form of an alarm system, a defect does not render the entire system inoperative. Further, since the alarm unit 10, the display lamp unit 20, and the illumination push-button unit 30 may be separately prefabricated, the alarm apparatus may easily be completed, without any wiring work, by merely assembling these units and connecting them by means of the connector screws 8 and 8. Moreover, the alarm apparatus of the present invention may be made small and compact due to the fact that the parts required to complete the alarm apparatus are considerably less in number than those required in the conventional one.

I claim:

1. An alarm apparatus comprising:

an astable multivibrator circuit having two output terminals and, when activated in a normal condition, assuming a first state in which first and second potentials are alternately produced at each of said two output terminals in opposite relation with each other;

first means activating said astable multivibrator circuit in response to an alarm signal;

second means for indicating the presence of the alarm signal;

third means connected to a predetermined one of said two output terminals of said astable multivibrator circuit for activating said second means during the presence of said first potential at said predetermined one output terminal;

acoustic signaling means for producing an acoustic signal in response to said second potential;

fourth means connecting said second potential appearing at said two output terminals to said acoustic signal means;

fifth means for rendering ineffective said second potential applied to said acoustic signaling means when said fifth means is activated;

sixth means for switching said astable multivibrator circuit in response to the activation of said fifth means from said first state to a second state in which said two output terminals are simultaneously held at said first potential.

2. An alarm apparatus according to claim 1, wherein said astable multivibrator includes a first transistor and a second transistor, a resistor connected to the base of each of said first and second transistors for applying a base bias therethrough, the resistance of each said resistor being selected to be larger than the resistance between the collector and the emitter of the corresponding one of said first and second transistors when it is conductive, the base of each of said first and second transistors being connected through said base resistor and a capacitor to the collector of the other one of said first and second transistors; said third means including a third transistor associated with one of said first and second transistors in the Darlington connection; said second means being connected in the collector circuit of said third transistor; said fourth means includes a diode connected between the collector of each of said first and second transistors and said connector terminal; and said fifth means includes a normally open switch connected between said connection terminal and ground potential.

3. An alarm apparatus according to claim 2, wherein said sixth means switches said astable multivibrator circuit from said first state to said second state in response to the fact that said normally open switch is closed for a given duration.

4. An alarm apparatus according to claim 1, comprising a prefabricated first unit including said astable multivibrator circuit, said first means, said third means, said fourth means, and said sixth means, a prefabricated second unit including said second means, and connector means for connecting said first and second units.

5. An alarm apparatus according to claim 4, wherein said second unit further includes said fifth means.

6. An alarm apparatus comprising:

multivibrator circuit means, having a pair of output terminals and operable between a first state in which low outputs are provided on both said terminals to a second state in which alternately low and high outputs repetitively are provided on said terminals and also to a third state in which high outputs appear concurrently and steadily on both said terminals, visual indicator means energized to provide a flashing indication in response to said second state of said multivibrator circuit means and energized to provide a steady illumination in response to said third state of said multivibrator circuit means, aural indicator means energized in response to said second state of said multivibrator circuit means, means responsive to an alarm signal to operate said multivibrator circuit means from its said first state to its said second state, manually operable means for selectively operating said multivibrator circuit means from its said second state to its said third state, and means responsive to the termination of said alarm signal to restore said multivibrator circuit means to its said first state.

* * * * *